UNITED STATES PATENT OFFICE.

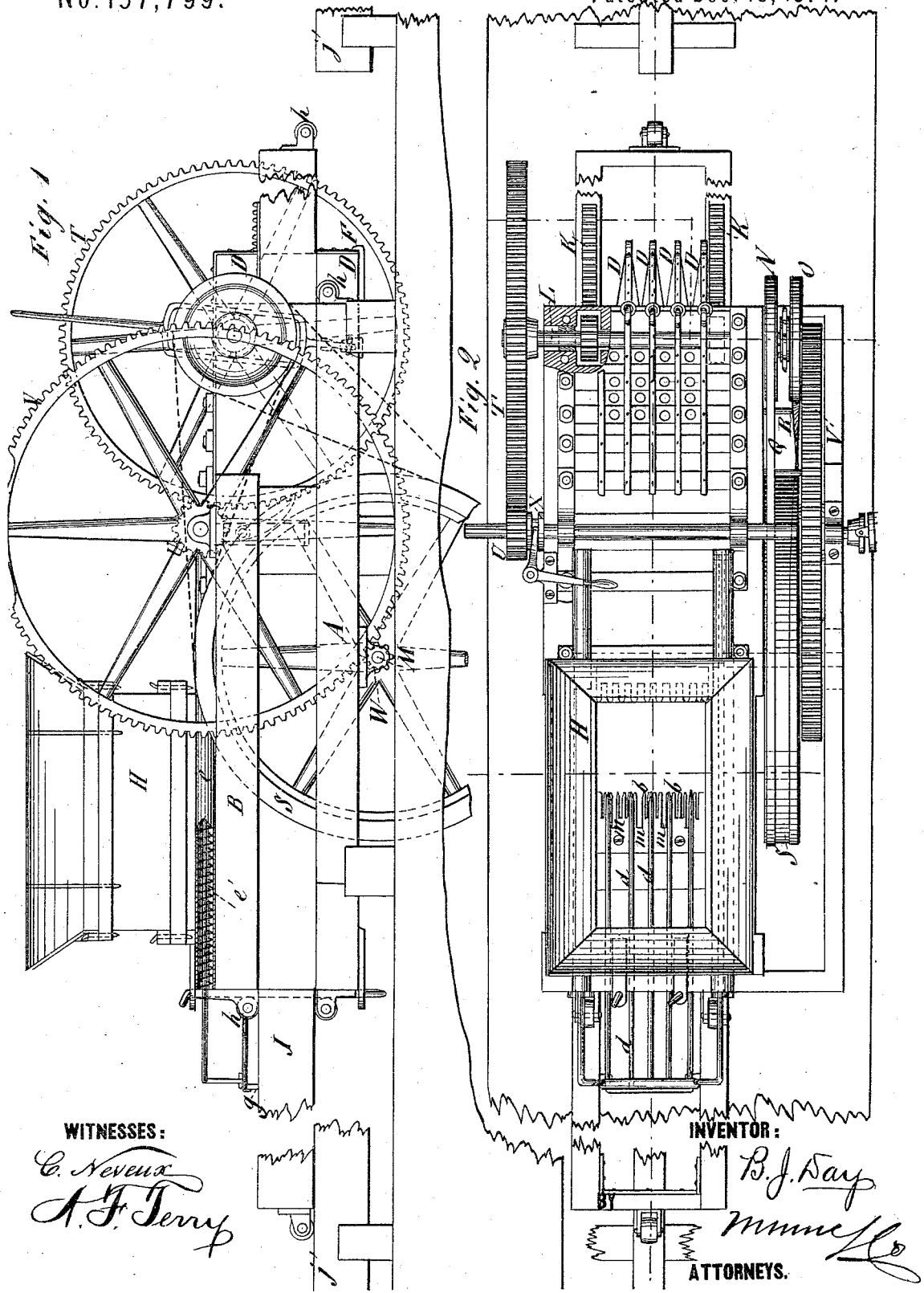
B. J. DAY.
Presses.
No. 157,799. Patented Dec. 15, 1874.
WITNESSES:
C. Neveux
A. F. Terry
INVENTOR:
B. J. Day
BY Munn & Co
ATTORNEYS.
2 Sheets--Sheet 1.

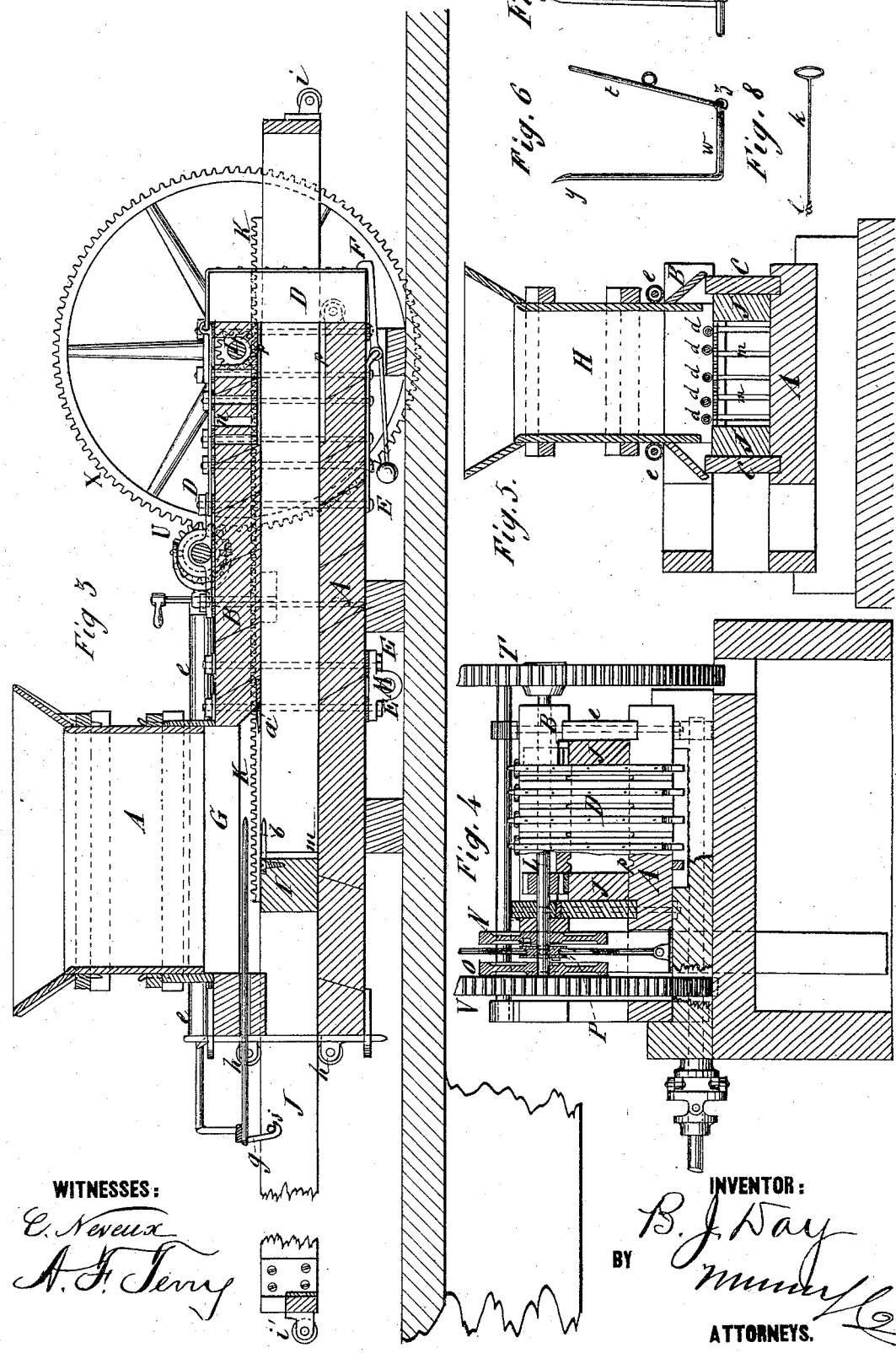

BENJAMIN J. DAY, OF EVANSVILLE, INDIANA.

IMPROVEMENT IN PRESSES.

Specification forming part of Letters Patent No. 157,799, dated December 15, 1874; application filed October 31, 1874.

*To all whom it may concern:*

Be it known that I, BENJAMIN J. DAY, of Evansville, in the county of Vanderburg and State of Indiana, have invented a new and Improved Press, of which the following is a specification:

My invention consists of a follower contrived with a couple of bars sliding forward and backward horizontally under the feeding-hopper and in the press-case, the said bars having a toothed rack, with which the driving-shaft gears, and the said shaft being geared to the main driver by one set of gears contrived to work the follower forward and quickly to utilize it for a beater, and the other being geared to apply great force for compressing the beaten hay or other substance into a bale. The invention also consists of a head to the case, constructed in sections to admit of fastening the hoops between them after the bale is pressed and before it is released, the said sections being hinged to the case, and provided with weighted catches to hold them closed, and to automatically fasten them. The invention also consists of a fork, which closes over the opening through which the hay is put into the pressing-case when the pressing begins, to hold the loose hay with which the hopper may be filled during the pressing, until the follower goes back behind it. The invention also consists of comb bars or guards, combined with the follower and the press-case, to prevent the matters to be pressed from gathering between the follower and the top of the press-case, where the follower passes from the filling-space into the case, and prevent the choking of the press thereat; and the invention also consists in combining a straining or tightening device with the block attached to the baling band or hoop, and the press-head made in sections, as hereinafter more fully described.

Figure 1 is a side elevation of my improved press, with a detail in section. Fig. 2 is a plan view. Fig. 3 is a longitudinal sectional elevation taken on the line $x\ x$ of Fig. 2. Fig. 4 is a transverse section taken on the line $y\ y$ of Fig. 2. Fig. 5 is a transverse section taken on the line $z\ z$ of Fig. 2. Fig. 6 is a side elevation, and Fig. 7 is a plan, of the jack for tightening the hoops; and Fig. 8 is a plan of a tool to be used for drawing a cord attached to a hoop through a groove in the press for pulling the hoops through.

Similar letters of reference indicate corresponding parts.

The pressing-case is composed of the strong plank bottom A and top B, side pieces C, and head D, the side pieces being arranged in grooves in the bottom and top, and secured by strong bolts E, and the head being made of independent sections, which are hinged at the upper end to the top B, and are provided with weighted catches F upon the bottom, for engaging and holding the lower ends when the head is closed for pressing. The head is hinged in this manner so that it can be opened to discharge the bale thereat, and it is made in sections, with spaces between for applying and fastening the hoops thereat, the said spaces coinciding with the grooves in the top and bottom for the hoops. The top has a large opening, G, near the end opposite the head, to admit the matters to be pressed, and over this opening is the feeding-hopper H. I is the follower. It is attached to the long bars J, which are arranged inside of the sides C of the press-case, to slide forward and backward for working the follower. On the top these bars have a toothed rack, K, with which the driving-shaft L gears to work them. This shaft is geared with the main driving-shaft M by the loose pulleys N O, clutch P, direct belt Q, crossed belt R, and the large driving-pulley S, to work the follower forward and backward quickly for stuffing the case preparatory to the pressing. The shaft L is also geared with the main driving-shaft M by the reducing-train T, U, V, and W, for applying the power for pressing. This train is coupled by a clutch, X, which is thrown out when the other driving-gear is used. *a* represents the comb-guard on the top of the press-case, and *b* a similar guard on the top of the follower, to prevent the hay from bulging up and choking between the follower and the press-case when forced into the latter. *d* represents the fork for closing over the pressing-chamber at the bottom of the feeder, to allow the hopper to be filled while pressing a bale, and keep the matters put in separate from those being pressed. It is attached to rods sliding in the tubes $e$, attached to the press-case, and containing springs $e'$, which pull the fork forward as the follower goes that way, and allow the rake to be pushed back when the follower goes back to open the passage into the press-case. The pins $f$ on the sliding bars J come against the hooks $g$, attached to the fork, when the follower goes back sufficiently in advance of the follower to move the fork back far enough to open the press-case, when the follower stops. The case is provided with friction-rollers $h$ for the bars J to ride on, and it carries rollers $i$ at the ends to roll along tracks arranged in advance of the case, for supporting the bars when extending beyond it. $k$ is a rod with a worm, $l$, on the end, for reaching down in the grooves $m$ in the follower, through holes $n$ in the top of the case, to draw up cords attached to the ends of the hoops introduced in the grooves $p$ of the bottom; also, for reaching in the grooves in the top of the case, for pulling said cords to the front. The lower end of the hoop is nailed fast to a little block which is put in between the sections of the press-head up to the bale. The jack, Figs. 6 and 7, is then applied by putting the toes $q$ under the lower end of the block, and the upper end of the hoop is passed under the roller $r$, between the toes, and attached to lever $t$ by a cord, or in any approved way. The lever is then pulled backward to strain the hoop, which is then nailed to the block and thus made fast. The sections of the press-head D are tapered from inside outward, to facilitate the putting in the blocks and the nailing of the hoops to them. The lever $t$ is pivoted to the base $w$ for a fulcrum, and the base has lateral extensions $z$ for holding it upright.

Having thus described my invention, I claim as new and desire to secure by Letters Patent—

1. The combination of the follower I, racks K, and the driving-shaft L with the press-case, substantially as specified.

2. The weighted catches F, combined with the sectional hinged press-head D and the press-case, substantially as specified.

3. The combination of comb-guards $a$ and $b$ with the press-case and follower, substantially as specified.

4. The combination of the guard-fork $d$ with the case, feeder, and follower, substantially as specified.

5. The guard-fork arranged to slide forward and backward between the feeder and the case, and to be actuated by springs and by the slide-bars, substantially as specified.

6. The driving-shaft L for working the follower, geared to the main driving-shaft M by the beating-train N O P R S, and also by the pressing-train T, U, V, and W, substantially as specified.

7. The combination, with the press-head made in sections, and the block attached to the baling-hoop, of the straining-jack $q\ r\ s\ t\ z$, all constructed and arranged as shown and described, to operate as specified.

BENJAMIN J. DAY.

Witnesses:
A. M. OWEN,
P. CRAWFORD.